US009811910B1

(12) United States Patent
Baldwin

(10) Patent No.: US 9,811,910 B1
(45) Date of Patent: *Nov. 7, 2017

(54) CLOUD-BASED IMAGE IMPROVEMENT

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/714,747

(22) Filed: May 18, 2015

Related U.S. Application Data

(63) Continuation of application No. 13/830,936, filed on Mar. 14, 2013, now Pat. No. 9,036,943.

(51) Int. Cl.
G06K 9/54 (2006.01)
G06T 7/00 (2017.01)
G06F 17/30 (2006.01)

(52) U.S. Cl.
CPC ........ *G06T 7/0038* (2013.01); *G06F 17/3028* (2013.01); *G06F 17/30247* (2013.01); *G06T 2207/10016* (2013.01); *G06T 2207/20216* (2013.01)

(58) Field of Classification Search
CPC ........... H04N 13/0007; H04N 13/0051; H04N 13/0239; H04N 13/0242; H04N 13/0296; H04N 5/23203; H04N 5/23206; H04N 5/23222; H04N 5/23238; H04N 5/2354; H04N 5/247
USPC ..... 382/305, 307; 348/36, 584, 218.1, 222.1
See application file for complete search history.

(56) References Cited

U.S. PATENT DOCUMENTS

| 8,411,141 | B2 * | 4/2013 | Hirai | G11B 27/105 348/143 |
| 9,036,943 | B1 * | 5/2015 | Baldwin | G06K 9/00664 382/103 |
| 9,454,701 | B2 * | 9/2016 | Liu | |
| 9,497,425 | B2 * | 11/2016 | Hu | H04N 7/183 |
| 2002/0122113 | A1 | 9/2002 | Foote | |
| 2004/0125115 | A1 * | 7/2004 | Takeshima | G06T 13/80 345/634 |
| 2004/0197075 | A1 * | 10/2004 | Aiso | G06T 3/40 386/264 |

(Continued)

OTHER PUBLICATIONS

Chen, Chia-Yen, et al., "Image Stitching—Comparisons and New Techniques," Computer Analysis of Images and Patterns, 1999, pp. 615-622, Springer-Verlag, Berlin, Heidelberg.

*Primary Examiner* — Mekonen Bekele
(74) *Attorney, Agent, or Firm* — Polsinelli LLP

(57) ABSTRACT

Approaches are described for managing the processing of image or video data captured by a portable computing device. The device provides a set of images to a remote server executing "in the cloud". The set of images can include a reference image and at least one other image captured subsequent or prior to the reference. Upon receiving the set of images at the remote server operating, the remote server can process the images to determine a similarity between the reference image and each of the other images. Thereafter, each image having a similarity value above a similarity value threshold can be aligned with the reference image, and the pixel values for corresponding locations in each of the images can be combined to create a processed image. The processed images can be provided to the computing device from the remote server, where the user can decide to accept or discard the image.

20 Claims, 8 Drawing Sheets

(56) References Cited

U.S. PATENT DOCUMENTS

| | | | |
|---|---|---|---|
| 2007/0081081 A1* | 4/2007 | Cheng | G06T 3/4038 348/218.1 |
| 2009/0021576 A1* | 1/2009 | Linder | G03B 37/00 348/36 |
| 2010/0194851 A1* | 8/2010 | Pasupaleti | H04N 1/3876 348/36 |
| 2011/0142370 A1* | 6/2011 | Joshi | G06T 3/4038 382/307 |
| 2011/0150282 A1 | 6/2011 | Gupta | |
| 2011/0235885 A1* | 9/2011 | Rauch | A61B 6/4441 382/131 |
| 2012/0294549 A1 | 11/2012 | Doepke | |
| 2012/0294583 A1* | 11/2012 | Kosaka | G06T 13/80 386/230 |
| 2013/0002808 A1* | 1/2013 | Moon | G03B 37/04 348/36 |
| 2013/0033568 A1* | 2/2013 | Kim | G03B 37/04 348/36 |
| 2013/0163961 A1* | 6/2013 | Wu | H04N 5/772 386/280 |
| 2013/0176430 A1* | 7/2013 | Zhu | G06T 7/2053 348/143 |
| 2014/0098187 A1* | 4/2014 | Yamashita | H04N 5/23229 348/36 |
| 2014/0099022 A1* | 4/2014 | McNamer | G06T 11/001 382/164 |
| 2014/0118257 A1* | 5/2014 | Baldwin | G06F 3/017 345/158 |
| 2016/0267680 A1* | 9/2016 | Lin | H04N 5/2353 |

\* cited by examiner

CLOUD-BASED IMAGE IMPROVEMENT

CROSS-REFERENCE TO RELATED APPLICATIONS

This application is a continuation of U.S. application Ser. No. 13/830,936, filed Mar. 14, 2013, entitled "CLOUD-BASED IMAGE IMPROVEMENT;" which is hereby expressly incorporated herein by reference in its entirety

BACKGROUND

As computing devices offer increasing processing capacity and functionality, users are able to operate these devices in an expanding variety of ways. For example, mobile devices are increasingly offering multiple high quality cameras that are capable of capturing high resolution images and/or videos. However, in a number of situations, portable computing devices lack the computing power and/or storage capacity to adequately process the images. Accordingly, users are increasingly turning to network resources, such as remote servers executing "in the cloud" to perform various tasks, such as to store data and process programs. While early versions of cloud computing included services such as web-based email, cloud computing has since evolved into cloud-based storage of documents, photos, movies, and computer programs. These cloud-based services can serve minimally as a backup, or more ambitiously as a replacement for traditional desktop computing. As cloud-based computing services continue to evolve and provide enhanced processing power, greater storage, faster networks, and ubiquitous access to one's data, the utility to uses likewise increases.

BRIEF DESCRIPTION OF THE DRAWINGS

Various embodiments in accordance with the present disclosure will be described with reference to the drawings, in which.

DETAILED DESCRIPTION

Figure 1:
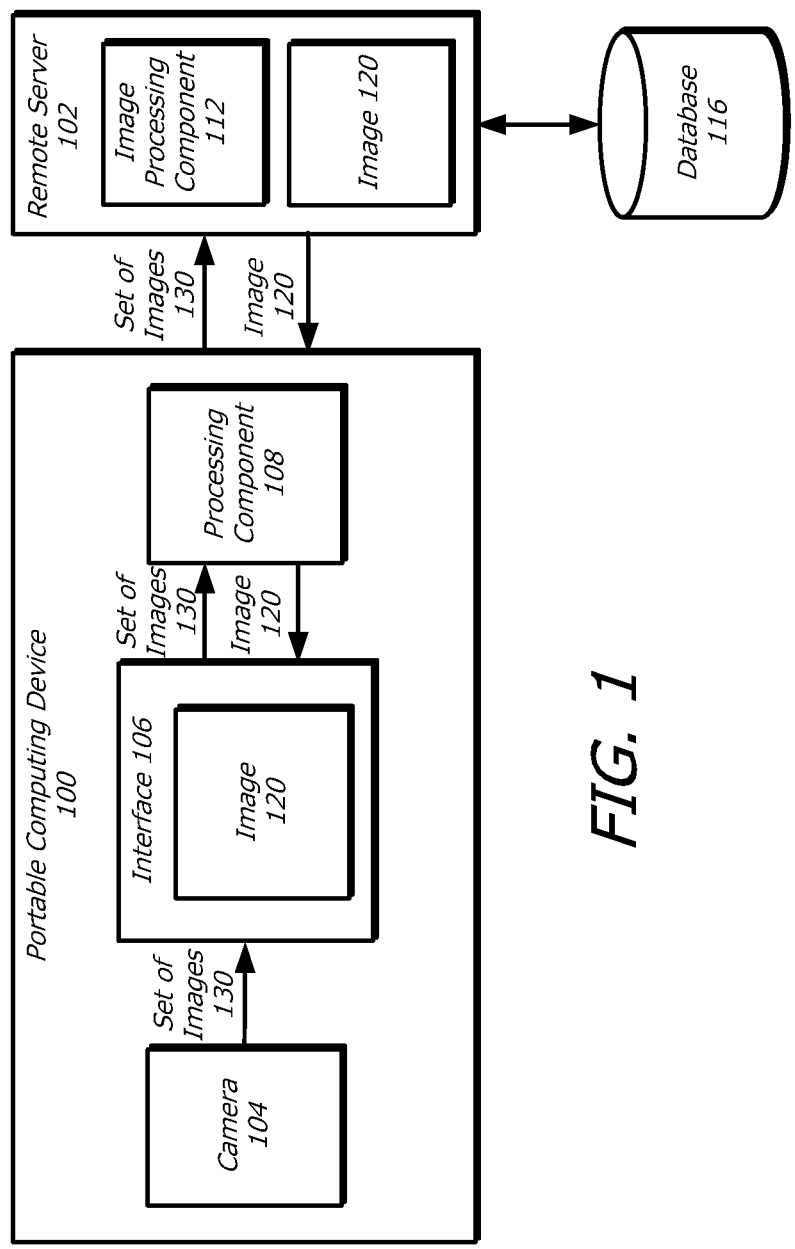
FIG. 1 illustrates an example set of basic components for producing an image at a remote server based on image or video data captured by a portable computing device, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing the processing of one or more images or video, via an electronic device. In particular, various embodiments enable a computing device (e.g., a mobile phone) or other portable computing device to utilize a camera to automatically capture a set of images in response to an input (such as a user pressing or activating a shutter of the computing device) or other detected event or action. The set of images can include a reference image corresponding to the input and at least one other image captured subsequent and/or prior to the reference. For example, the camera of the computing device can be operating in a full-frame video mode in which images are captured in succession and stored to a memory element of the computing device. Alternatively, the images can be captured by the user repeatedly pressing a shutter or other image capture button. The reference image can be the image selected upon receiving the input by the user, and at least one other image subsequent (or prior) to the reference image can be stored in the memory element upon receiving the input by the user. In accordance with an embodiment, the at least one other image can be one or more of the previously captured images, the subsequently captured images, or a subset of the previously and/or subsequently captured images relative to the reference image. In any situation, the images include a view of substantially a same area.

The set of images then can be processed on the device and/or uploaded or otherwise transmitted to a remote service or server, such as may be executing in a shared resource environment or "in the cloud," for processing. In at least one embodiment, a remote service can utilize information from the additional images to attempt to improve a quality, resolution, sharpness, color depth, or other such aspect of the reference image.

Upon receiving the set of images at the remote server, for example, the remote server can process the set of images to determine a measure of similarity (also known as a similarity value) between the reference image and the at least one other image (herein also known as the additional image(s) or secondary image(s)) to quantify how similar two images are to one another. Thereafter, each of the at least one other images having a measure of similarity above a similarity value threshold, with respect to the reference image, can be aligned with the reference image such that corresponding features in the images are aligned, and the pixel values for corresponding locations in at least a portion of each of the images can be combined (e.g., averaged, interpolated, etc.) to create a processed image. The processed and original reference images can be provided to the computing device from the remote server in at least some embodiments, where the user can decide to accept, save, and/or discard either image. The accepted (and in some instances the discarded) images can be stored on the computing device and/or the remote server, where the images stored on the remote server can be accessible to the computing device.

In accordance with an embodiment, other image processing applications can be performed at the remote server. For example, the remote server can be used to process a set of images used to create a panoramic image. In this instance, a set of images can be communicated from the computing device to the remote server, where the set of images is a plurality of panoramic constituent images, and each image of the plurality of panoramic constitute images can be tagged as being part of a particular panoramic sequence. Upon receiving the images at the remote server, the remote server can combine the images as a panoramic sequence based on the tag associated with each image. Thereafter, the panoramic sequence can be processed further, such as to correct for lens distortion, perspective, brightness, rotation, etc. Additionally, in accordance with an embodiment, in response to combining the plurality of panoramic constitute images, the remote server can be configured to detect at least a portion of one of the plurality of panoramic constituent images overlapping an adjacent portion of one of the plurality of panoramic constituent images, and can statistically combine pixel values for corresponding locations of the portion of the one of the plurality of panoramic constituent images overlapping the adjacent portion one of the plurality of panoramic constituent images. The panoramic sequence can then be provided to the computing device, where the user can select to store a copy of the panoramic sequence on the computing device, the remote server (such as in a cloud-based photo album), or both. Alternatively, the user can select to discard any one of the images while saving the other, or discard all of the images.

In accordance with an alternate embodiment, the set of images are not tagged as being part of a panoramic sequence, as this assumes forethought and interaction by a user. In the alternate embodiment, as the user captures images (either manually through the press of a shutter release button, or automatically as the device operates in full-frame video mode), metadata is stored along with the images. The metadata can include information about the each image, such as time information (e.g., a time stamp indicating when the image was captured) and location information. Location information can include the location of the device and orientation of the device relative to the user as the images are captured. The location information can be obtained using one or more sensors of the device, such as GPS, accelerometer, mobile tower, etc. Accordingly, upon providing the images to the remote server, the remote server can use the time and location information to determine images proximal in time and proximal in location, and based on this determination, the images can be "post tagged" or grouped as being part of a panoramic sequence. The images can then be analyzed for similarity, where when the similarity exceeds a threshold, the images can be combined as a panoramic sequence. In the situation where the images are not combined as a panoramic sequence, the images can be combined in accordance with other embodiments described herein, namely aligning and combining the images. Thereafter, the panoramic sequence can be processed further, such as to correct for lens distortion, perspective, brightness, rotation, etc. While more compute intensive, this alternate embodiment requires less interaction by the user. In other embodiments, both methods may be employed simultaneously.

Various other functions and advantages are described and suggested below as may be provided in accordance with the various embodiments.

As mentioned above, in some instances the limited processing power of portable computing devices cannot support computationally intensive image processing applications, or only supports reduced processing capability as compared to the processing capability of desktop or server-based systems. As such, it can be desirable to provide access to more powerful resources that allow for computationally intensive image processing applications directly from a user's portable computing device, and since users are increasingly uploading image and video data from their portable computing device to remote servers, such as cloud-based photo albums having cloud-computing resources, these resources can be used to perform image processing not supported by the user's portable computing device, or to a higher resolution and quality standard than can be supported by the user's portable device. Accordingly, systems and methods in accordance with various embodiments provide for producing an image based on image or video data captured by a portable computing device.

FIG. 1 illustrates an example implementation for producing an image at a remote server based on image or video data captured by a portable computing device, in accordance with an embodiment. As shown in FIG. 1, a portable computing device 100 is in communication with a remote server 102 executing across at least one network. The portable computing can device can be a mobile phone or any computing device that can be operated by a user. The portable computing device can utilize some of the same elements as a conventional device, such as may include a display screen and a front and rear-facing camera. The device can include other elements useful for imaging as well, such as a light sensor for determining an amount of ambient light and a white light LED, or other such illumination element, useful in illuminating objects within at least a portion of a field of view of the camera. The remote server 102 can be part of a shared resource or multi-tenant environment, and can be any type of server such as an application server, a web server, etc.

The portable computing device 100 includes a camera 104, an interface 106 (e.g., a display element) that displays the field of view of the camera, and a processing component 108. The camera can include a lens and an image sensor that converts an optical image into an electrical signal. The portable computing device can be aimed in different directions and the interface can display an image or video of the current/active field of view being captured by the camera, or any other image or video captured by the camera. The camera can capture one or more images, such as a set of images 130, in response to an input by a user (such as pressing or activating a shutter of the camera). For example, a user can press a shutter-release button, where when pressed, the shutter of the camera is "released", so that it opens to capture an image, and then closes, allowing an exposure time as determined by the shutter speed setting (which may be automatic). In various embodiments, the portable computing device can utilize an electronic shutter, as opposed to a mechanical shutter, and on a portable computing device that lacks a physical button for this purpose, a virtual button can be used to capture the one or more images.

The set of images 130, for example, can include a reference image corresponding to the input and at least one other image, such as an image captured subsequent or prior to the reference image, where each of the images includes a view of substantially a same area. For example, as described above, the camera of the device can be operating in a full-frame video mode in which images are captured in succession and stored to a memory element of the device. The reference image can be the image selected upon receiving the input by the user, and at least one other image subsequent (or prior) to the reference image can be stored in the memory element upon receiving the input by the user. In accordance with an embodiment, the at least one other image can be one or more of the prior captured images, the subsequently captured images, or a subset of the prior and subsequently captured images. In any situation, the images include a view of substantially a same area.

In accordance with various other embodiments, the reference image selected by the user input may not be the intended reference image because, e.g., the user pressed the shutter release button too early (or late) or the target of the image (or the user capturing the image) moved during the time of capturing the image. Accordingly, upon receiving the user input, the user can be presented with the selected reference image and the set of images. The user can approve the reference image, or select one of the images from the set of images as the new reference image. Thus, in the case the user is not satisfied with the initial reference image, the user can reselect an image from the set of images as the reference image.

The processing component 108, in this example, can process the set of images and can be used to facilitate communicating the images to the remote server. For example, the processing component can organize, compress, tag, and/or package the images to be communicated to the remote server, where the images can be communicated to the remote server in a number of ways, such as through a mobile network, wireless network, or some other communication medium that can be used to transfer and receive data, for example.

The remote server 102 or service, may be executing in a shared resource environment, and in this example, includes an image processing component 112 that can be used to process the set of images. For example, upon receiving the set of images at the remote server, the remote server can process the images to determine a level of similarity (herein also known as a measure of similarity or a similarity value) between the reference image and at least one other image. In accordance with an embodiment, the level of similarity can be a value that represents the similarity between two images. A number of approaches can be used to determine how similar two images are. For example, the level of similarity can be determined using a correlation algorithm (such as a cross-correlation algorithm). For example, in one instance, the integer components of an image's brightness at each pixel can be used in a cross-correlation algorithm to determine the level of similarity between the reference image and at least one other image. In another instance, each pixel can be treated as a vector (e.g., in the case of color images), the vectors can be normalized, for example, to account for at least some variation in brightness due to light and exposure conditions, and the cross-correlation between the two images can be computed. The result can be a value between 0 and 1, and the result can be used to indicate a percent similarity of the two images. The result can be compared to a predetermined threshold, where in some embodiments, the threshold indicates a level of acceptable similarity. For example, a result above 85 percent can be used to indicate that the images are similar.

Further, the level of similarity can be determined using perceptual hash algorithms. Perceptual hash algorithms describe a class of comparable hash functions, and one or more features in an image can be used to generate a distinct (but not unique) fingerprint, and these fingerprints can be compared. For example, the fingerprints determined in the reference image can be compared to the fingerprints of another image to determine the level of similarity between the images. It should be noted that it is well understood how to determine a level similarity between images, and that in accordance with an embodiment, various algorithms can be used to determine how similar one image is to another image, such as perceptual hash algorithms or other comparable hash functions, key point matching algorithms, histogram matching algorithms, among others.

Thereafter, each of the at least one other image(s) having a measure of similarity above a similarity value threshold can be aligned with the reference image. That is, the set of pixel values representing the at least one image and the set of pixel values representing the reference image can be transformed into one coordinate system. In accordance with an embodiment, the images can be aligned using any number of image alignment algorithms or other algorithms to determine an alignment offset or other correspondence relationship among images with varying degrees of overlap. For example, these algorithms can be used to: determine an appropriate mathematical model that relates pixel coordinates in one image to pixel coordinates in another image; to estimate the correct alignments relating various pairs (or sets) of images such as an alignment offset; to use direct pixel-to-pixel comparisons combined with gradient descent (and other optimization techniques) to estimate the correct alignments. Additionally or alternatively, alignment algorithms can use distinctive features found in each image to efficiently match the distinctive features found in other images to rapidly establish correspondences and other alignment offsets between pairs of images, and the alignment offset can be used to align the two images.

Upon aligning the images, the pixel values for corresponding locations in at least one other image and the reference image can be combined (e.g., averaged, interpolated, etc.) to create a processed image 120 having an increased signal-to-noise ratio. For example, in accordance with an embodiment, combining pixel values for corresponding locations can include receiving as input two substantially similar sized images, and generating as output a third image of the same size as the first two, in which each pixel value of the third image is the sum of the values of the corresponding pixel from each of the two input images. In the case where the pixel values in the input images are vectors rather than scalar values (e.g., for color images), then the individual components (e.g., red, blue and green components) are added separately to produce the output value. It should be noted that other methods and/or algorithms can be used to combine pixel values, and the embodiments disclosed herein are not meant to be taken as limiting. For example, a summing algorithm can be used, where the output image is the sum of the input images. An averaging algorithm can be used, where the output image is the average of the input images. A median algorithm can be used, where the output image is the median of the input images at each pixel. A minimum or maximum reject algorithm can be used, where the output image is the average of the input images, excluding the minimum, maximum, or both, respectively, at each pixel. It should be noted that these are example algorithms that can be used in accordance with embodiments described herein and are not to be taken as limiting.

As described above, the processed image can have an increased signal-to-noise ratio. For example, when an image is captured, noise can be included in each pixel making up the image, where the value of the noise can be random, and the distribution of noise values for corresponding locations in each of the images can have a Gaussian distribution. Accordingly, the value of any given pixel can include a true value of the object being imaged (i.e., the value being recorded by a CMOS sensor of the camera) plus some random Gaussian noise value, which might make the captured value less than the captured value or more than the captured value. It should be noted that it is well understood that the combination of values having a Gaussian distribution will converge asymptotically toward zero. Thus, in accordance with various embodiments, combining the pixel values for corresponding locations in each of the images can cause the noise component of each pixel to converge to zero, thereby allowing the combined pixels values for corresponding locations to approach the true value being recorded by the CMOS sensor. It should be noted that combining the images is a pixel-by-pixel operation, where each pixel is operated on completely independent of all other pixels.

In another embodiment, the pixels are not aligned globally between different images but are piece-wise aligned between images. In this instance, an object can be selected in the reference image and can be used as the focal point of alignment, where the object in each image in the set of images is aligned to the object in the reference image. This allows images to be improved where one part of the image has moved relative to the rest of the image, for example, a dog moves relative to the background. In this instance, by piece-wise combining pixels for the dog at an alignment optimized for the dog, and piece-wise combining pixels for the background at an alignment optimized for the background, a composite image can be generated with an overall improved signal-to-noise ratio.

The processed image 120 can be provided to the computing device from the remote server, and the processed and/or the reference image can be presented to the user. The user can be presented a prompt on whether to accept, save, or discard either image. The accepted (and in some instances the discarded) images can be stored on the computing device and/or the remote server, such as in a database 116 located on or separate from the remote server. In accordance with an embodiment, the images stored on or associated with the remote server can be accessible to the computing device, and in some instances, the images stored are accessible for a determined period of time. For example, in at least some instances, the user may have established an account with a service that provides a cloud-based photo album, where the album may have a storage limit associated therewith. Based on this limit, the user may optionally have certain stored images automatically deleted from the photo album to free up space, where the images can be deleted based on a rule or other setting. For example, the user may decide to have images above a certain size to be deleted after a determined period of time.

Figure 2:
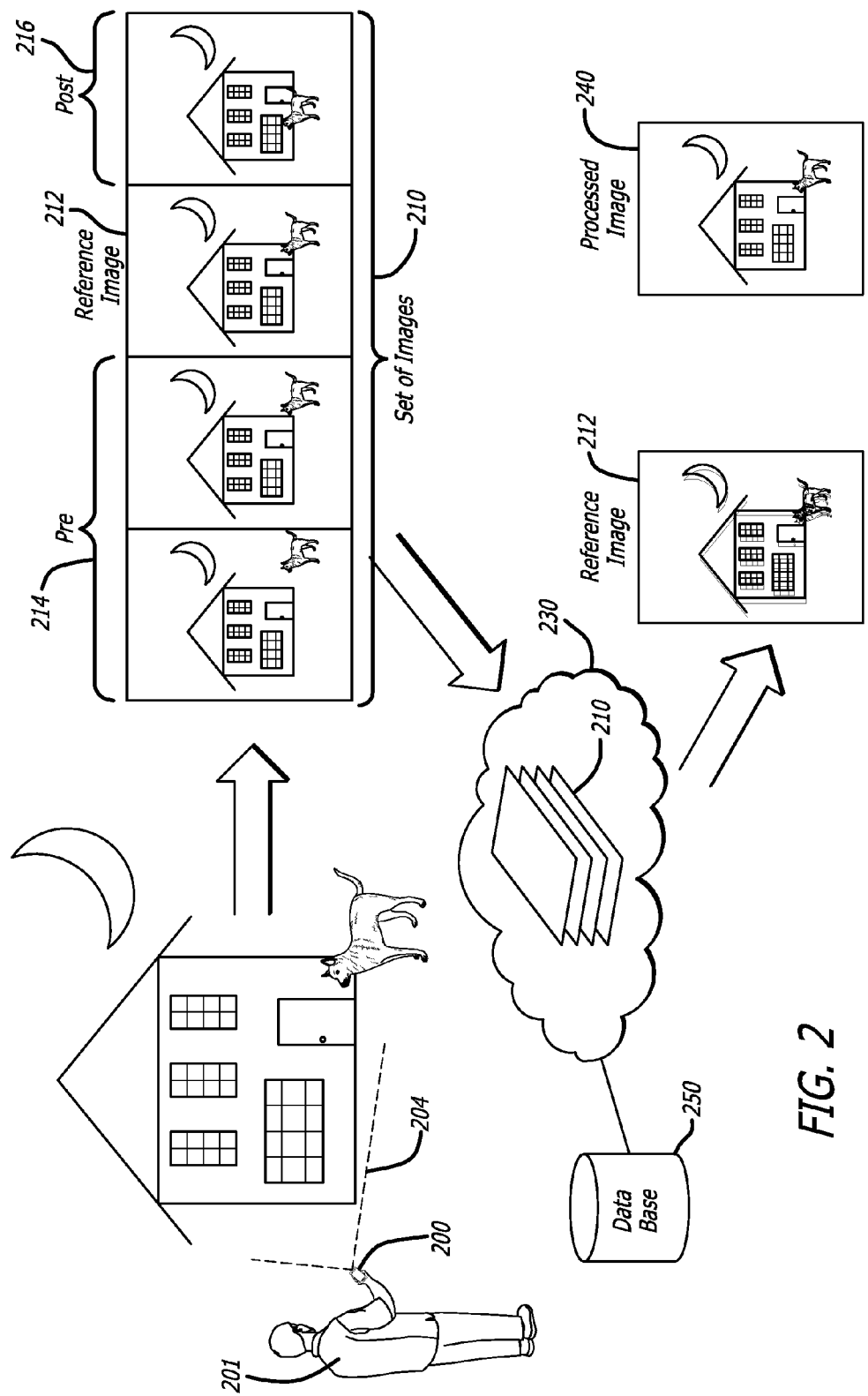
FIG. 2 illustrates an example implementation for producing an image at a remote server based on image or video data captured by a portable computing device, in accordance with an embodiment, in accordance with an embodiment.

FIG. 2 illustrates an example implementation for producing an image based on image or video data captured by a portable computing device, in accordance with an alternative embodiment. As shown in FIG. 2, a user 201 is holding a portable computing device 200, where the device is pointed at a dog in front of a house. The portable computing device includes a camera and an interface that displays the image captured in an active field of view 204 of the camera, in this case, the dog in front of the house. The picture is being captured at night, and thus, the lighting conditions are not ideal. As a result, image quality can be compromised resulting in a low signal-to-noise ratio. Additionally, the dog is moving, which can further affect image quality due to the low light and other limitations of the portable device, such as ISO settings, image sensors, etc.

As the user takes a photograph of the dog and the house, a set of images 210 can be captured by the camera of the computing device. For example, as described above, the device can be operating in a full-frame video mode in which images are captured in succession and stored to a memory element of the device. The pressing of a shutter button (or when some other indication is received that a picture is to be captured) can cause the current frame being captured to be selected as the reference image, and a number of frames before and/or after the reference image can be stored in the memory element of the computing device. Thereafter, a subset of the frames (or all of the frames) stored in the memory element can be used to create the set of images.

For example, as shown in FIG. 2, the set of images 210 includes the reference image 212, at least one image captured prior to the reference image 214, and at least one image captured subsequent to the reference image 216, where each of the images includes a view of substantially a same area (i.e., the dog and the house). In accordance with an embodiment, the reference image can be the image captured in response to an input by a user, such as a pressing of a shutter-release button. In some instances, however, the reference image selected by the user input may not be the intended reference image because, e.g., the user pressed the shutter release button too early (or late) or the target of the image (or the user capturing the image) moved during the time of capturing the image. Accordingly, upon receiving the user input, the user can be presented with the selected reference image and the set of images, where the user can approve the reference image, or select one of the images from the set of images as the new reference image.

It should be noted that the number of images included in the set of images is not limited to what is shown in FIG. 2. For example, in various embodiments, the number of images included in the set of images may be limited by the capacity of the memory element used to store or buffer the images before the images are processed. In this instance, the memory or buffer capacity of the portable computing device can act as the upper limit to the number of images that can be included in the set of images, and in the instance where memory is limited (e.g., because the memory element is full of images), images least coincident with the reference image can be removed from the set of images. Additionally or alternatively, only images determined to be of a certain quality may be included in the set of images (e.g., all images may be removed except images having a certain amount of pixel data) when memory is limited.

In accordance with various other embodiments, the number of frames stored in the memory element of the portable computing device can depend on several factors, such as the speed of connection between the camera (i.e., the image sensor) and the image processing component of the device and the storage capacity of the memory component, where higher bandwidth connections can allow for more frames per second (fps) to be stored in the memory element. In other embodiments, the number of images captured before and/or after the reference image can be a predetermined number such as two.

The set of images, for example, can be communicated to at least one remote server 230 or some other appropriate location, such a service for hosting a cloud-based photo album. The user can communicate with the remote server through a network such as the Internet, as well as any cellular networks or other networks used to transmit such data. Upon receiving and/or storing the images, a system (or service) at the remote server can perform an analysis on the set of images. As described above, the system can process the set of images to determine a level of similarity between the reference image and each of the other images in the set of images, where the level of similarity can be determined using a correlation algorithm or some other such comparison algorithm known or used for such purposes.

Thereafter, each image having a similarity value above a similarity value threshold with respect to the references image can be aligned with the reference image, and the pixel values for corresponding locations in each of the images can be combined (e.g., averaged, interpolated, etc.) to create a processed image having an increased signal-to-noise ratio, increased sensitivity, reduced noise, increased dynamic range, and increased color accuracy and sensitivity, for example.

In accordance with an embodiment, aligning the images can include determining a target portion of the reference image, such as the house or dog, and processing the images based on the determined target portion. Determining the target portion (e.g., as the house or dog) can depend on several factors, such as the focus of the image (e.g., whether the center of the image is the house or dog), and whether the selected target portion can produce an image having an improved signal-to-noise ratio. In other embodiments, the user can touch a touch screen displaying the active field of view of the camera, where the user can touch an area of the screen that displays the house to select the house as the target portion, or the user can touch an area of the screen that displays the dog to select the dog as the target portion. Additionally or alternatively, the user can draw (e.g., by touching the touch screen) a box or other object around the area of the active field of view to select that area as the target portion. In any situation, the user can select the target portion prior to capturing the set of images, or the remote server can cause an alert to display on the user's device prompting the user to select a target portion. For example, if the remote server determines two or more target portions in the set of images, and the user has not indicated a target portion, the remote server can cause a prompt or other alert to display on the computing device prompting the user to select a target portion.

In this situation, the target portion is the house, where the processed image can include improved image quality of the portion of the image including the house, but a blurry image of the portion of the image including the dog. If the target portion were the dog, the house and other areas of the image not including the dog could be blurry. This is because the dog would be used to align the images, and since the dog is moving, the areas other than the dog would be misaligned, and combining the pixels for corresponding locations in those areas would result in a blurry image outside the dog. It should be noted that in some instances this may be a desired outcome. Additionally, in accordance with an embodiment, a plurality of processed images can be provided to the computing device, where each processed image can be based on a different selected target portion.

Upon selecting the target portion, a first area of one of the images (such as a subsequent image to the reference image) can be determined, where the first area can be substantially the same size and in the same position as the size and position of the target area. In this instance, since the house was selected as the target portion in the reference image, the determined first area of the sequent image can be the house. A first correlation value can then calculated between the target portion (i.e., the house in the reference image) and the first area (i.e., the house in the subsequent image).

A second area of subsequent image being substantially the same size as the target area is determined, and a second correlation value between the target portion and the second area can be calculated. In this instance, the second area can be an area of the image relatively the same size as the house. An alignment offset between the reference image and the subsequent image can then be determined based at least in part on first and second correlation value and the reference image, and the subsequent image can be aligned based at least in part on the offset. It should be noted that this process should be repeated until each image in the set of images is aligned to the reference image. It should be further noted that the various embodiments described herein are not limited to this particular technique of aligning images used to generate a processed image. Various alternative techniques can be used within the scope of the embodiments described herein, as will be evident to one or ordinary skill in the art. For example, upon piece-wise combining pixels values for the dog at an alignment optimized for the dog, and piece-wise combining pixels values for the background at an alignment optimized for the background, a composite image can be generated that has an improved signal-to-noise ratio when compared to a processed image generated by aligning to only one target object, such as in the case of aligning solely to the dog or to the background.

Thereafter, the processed image 240 (and in some instances, the reference image 212) can be provided to the computing device from the remote server 230, where the user can accept, save or discard either image. In this instance, the user would be provided the processed image where the focus of the image was the house, and although the sharpness of the house might have been improved, the quality of the image of the dog may have decreased. The user can accept, save, or discard the image. In other embodiments, the processed image can be based on the dog, where although the sharpness of the dog might have been improved, the quality of the image of the house may have decreased. As described above, the user can accept, save, or discard the image.

In accordance with an embodiment, the processed image can include metadata, where the user can "undo" the processing from the remote sever in a step-by-step manner. At certain stages of reversing the image processing of the remote server, the user can be provided with options prompting the user to, e.g., select a different target portion of the image, select a different image from the set of images as a reference image to which the set of images are aligned, or other image adjusting parameters. Upon, receiving the selection, the remote server can again process the set of images and provide an additional processed image to the computing device. Thus, for comparison, the user can be presented the original processed image, the new processed image, and the reference image used in the processing (at least for the new processed image).

In accordance with another embodiment, the accepted (and in some instances the discarded) images can be stored on the computing device 200 and/or the remote server 230 such as in a database 250 located on or separate from the remote server, where the images stored on or associated with the remote server can be accessible to the computing device 200.

Figure 3:
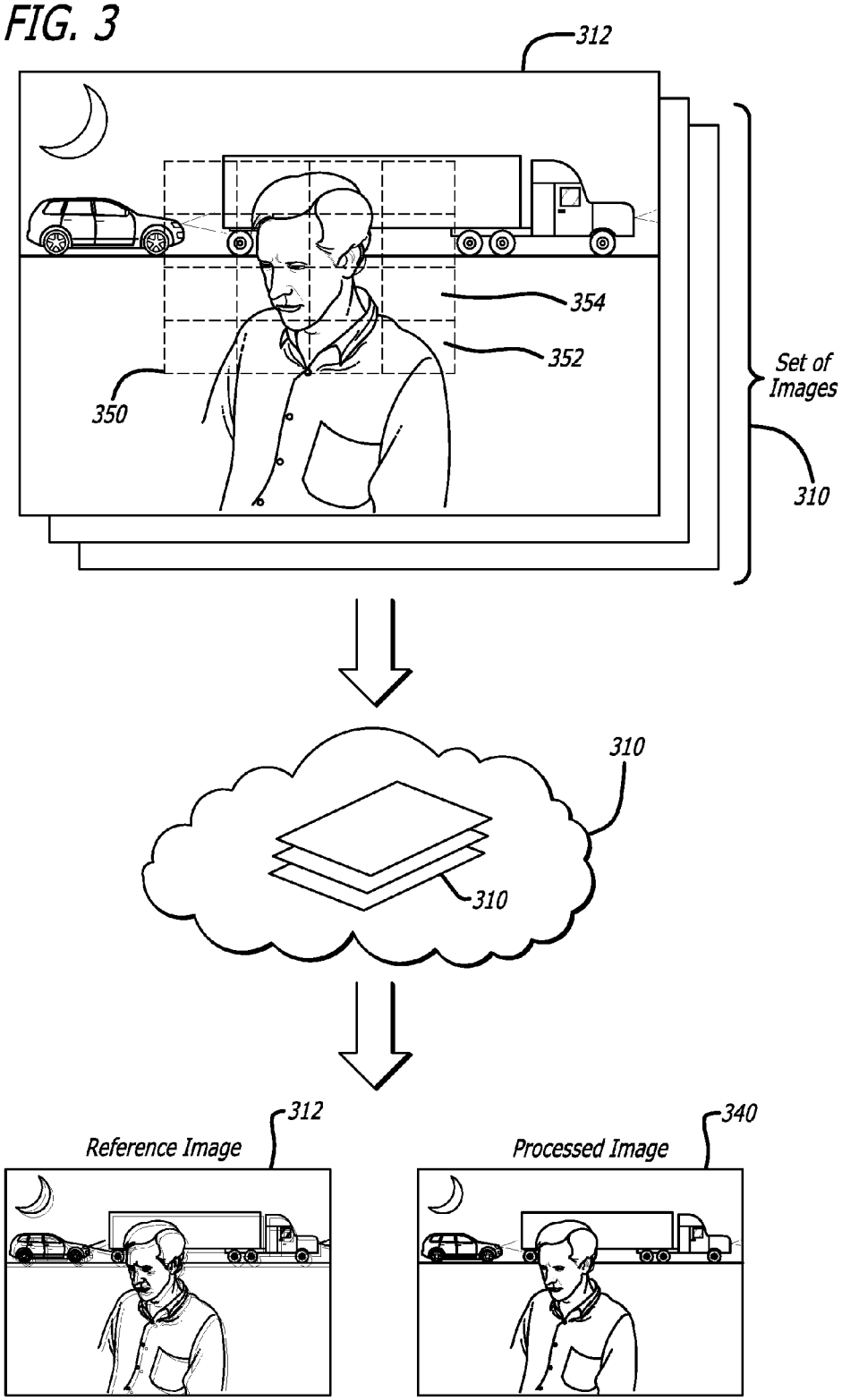
FIG. 3 illustrates an example implementation for producing an image at a remote server based at least on piece-wise combining images captured by a portable computing device, in accordance with an alternate embodiment.

In accordance with an embodiment, other processing can be performed on the set of images to improve and/or modify image quality when, e.g., one or both the camera and the target being captured are moving. For example, FIG. 3 illustrates an example implementation for managing the processing of images captured by a portable computing device when one or both the camera and the target being captured are moving, in accordance with an alternate embodiment. In this situation, because of the movement of the computing device being used to capture the image, the image quality is not optimal in that the resulting image is blurry (see reference image 312). In accordance with various embodiments, the image quality can be improved by piece-wise aligning one or more sections of each of the images in the set of images with corresponding sections of the reference image, and then statistically combining pixel values for corresponding locations of the piece-wise aligned images.

For example, as shown in FIG. 3, a set of images 310 can be captured using, e.g., a portable computing device. As described above, the set of images can include a reference image and one or more other images, where the other images can be captured before or after the reference image. In this instance, the set of images includes a person standing in front of two moving cars, where the portable computing device capturing the images was moved while the images were being captured, and as a result, the captured reference image 312 is blurry.

The set of images are communicated to a remote server 330 for processing. In this instance, it has been determined that the set of images are similar using, e.g., the approaches described above. In other situations, it may be determined that the images are not similar. For example, if a target or other object that is the focus of the image moves too much (i.e., the person in FIG. 3 is moving as the image is captured), or the camera is moved excessively while capturing the images, then it may be determined that the images are not similar. This can be because, for example, the target in each image cannot be aligned with the target in another image.

The set of images can be separated into sections (352, 354), and the sections can be piece-wise processed. For example, the set of images 310 can be analyzed using at least one object recognition algorithm to attempt to determine a target area 350, such as a face, object, and/or structure represented in the set of images, where the target area has a position within the set of images. A movement of the target area in the set of images can be determined based at least in part on the position of the target area in each of the images, and upon recognizing the target area and determining the movement, the target area can be separated into one or more sections (352, 354).

In accordance with an embodiment, the sections can range in size, but typically include at least one identifiable feature. As shown in FIG. 3, the target area 350 includes a person's face and the identifiable feature can be the person's eye, nose, or some other identifiable feature. Accordingly, the size of each section can be at or around the size of the person's eye. The identifiable feature can be determined in each of the images, and the images can be aligned to the position of the identifiable feature in the reference image. Once the images are aligned to the reference image, the pixel values for corresponding locations in each of the images for the target area can be combined to create a processed image 340.

In accordance with other embodiments, if one of the other image(s) is substantially a higher quality than the reference image, that image can be used to replace the reference image, and processing can continue with the replaced image being used as the reference image. Alternatively, the replaced image can be used without the processing. In other embodiments, if one of the other image(s) is substantially a higher quality than the reference image, sections (or as described above, the whole image) of that image can be used to replace sections (or all) of the reference image. Alternatively, the other images can be weighed higher when combining or averaging pixel values of corresponding locations for the various sections. In accordance with an embodiment, quality of the image can be determined by a number of factors, such as sign-to-noise ratio, lighting of the image, where the factors can be used to determine a quality of the image. The quality of an image can be compared to a threshold quality, where a reference image below that quality can be replaced with an image having a higher quality.

Thereafter, the processed image 340 and the original reference image 312 can be displayed on the computing device, where, as described above, the user can accept, save or discard either image.

Figure 4:
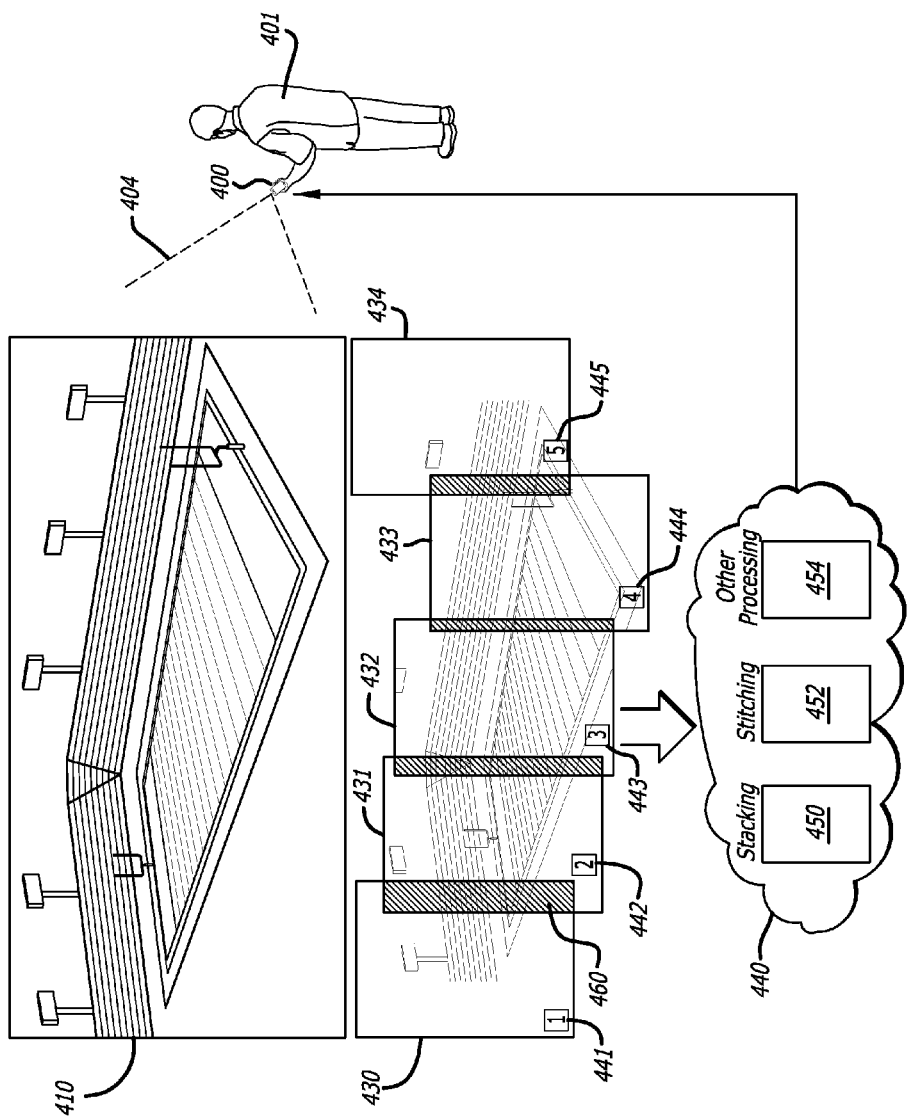
FIG. 4 illustrates an example implementation for producing a panoramic image at a remote server based on image or video data captured by a portable computing device, in accordance with an alternate embodiment.

FIG. 4 illustrates an example implementation for managing the processing of image data (such as image data used in a panoramic photograph) captured by a portable computing device, in accordance with an alternate embodiment. As shown in FIG. 4, a user 401 is holding a portable computing device 400, and the user is using the device to capture a panoramic image of a sports stadium 410. The portable computing device includes a camera and an interface that displays an image captured in an active field of view 404 of the camera, in this case, the sports stadium.

In accordance with an embodiment, the user may set their camera in a panoramic mode when capturing a photograph of the sports stadium, where in this mode a series of images are captured as a video stream as the camera is panned (left to right, up and down, or both). In this way, a wide angle view can be synthesized form a series of images taken sequentially. However, in conventional cameras, only a subsampled panoramic image of relatively low resolution is provided due to at least computational, memory, and power limits of the mobile processor.

As shown in FIG. 4, the camera is panned right to left to capture a set of images, where the set of images can be a plurality of panoramic constituent images (430-434). Each image of the plurality of panoramic constitute images can be tagged (441-445) as being part of a particular panoramic sequence, and the panoramic constituent images can be keyed to the device computed subsampled panoramic image. In this way, when a high resolution panoramic image is provided to the computing device, the device can replace and/or associate the high resolution panoramic image with the subsampled panoramic image.

The panoramic constituent images, in this example, are uploaded to a remote server 440, such as a cloud-based server that provides photo processing capabilities. The panoramic constituent images can be uploaded to the remote server in the background without user action. Additionally, uploading the images to the remote server can be set to occur only when the portable computing device is charging, or limited to times when the battery charge exceeds a preset level (e.g., uploads are not attempted if the battery charge state is below twenty percent), or only when the device is connected to a wireless network, among others.

Upon receiving the panoramic constituent images at the remote server, the remote server can perform one or more algorithms on the images, such as a stacking algorithm 450, a stitching algorithm 452, and/or other processing algorithms 454 to create the panoramic image of the sports stadium 410. For example, the cloud-based server can combine or otherwise stitch the plurality of panoramic constitute images together to create a panoramic sequence based at least in part on the tag associated with each image. In accordance with an embodiment, stitching algorithms can be used to combine multiple photographic images with overlapping fields of view to produce a panorama or other high-resolution image. In certain embodiments, image stitching algorithms can include three process components: image registration, calibration, and blending.

Image registration can involve matching features in a set of images or using direct alignment methods to search for image alignments that minimize the sum of absolute differences between overlapping pixels. Image calibration can involve minimizing differences between ideal lens models and the camera-lens combination used, optical defects such as distortions, exposure differences between images, vignetting, camera response and chromatic aberrations. In the situation where feature detection methods were used to register images and absolute positions of the features were recorded and saved, stitching software and or algorithms may use the data for geometric optimization of the images in addition to placing the images on the panosphere. Image blending can involve executing the adjustments figured out in the calibration stage, combined with remapping of the images to an output projection. Colors can be adjusted between images to compensate for exposure differences. If applicable, high dynamic range merging is done along with motion compensation and deghosting. Images are blended together and seam line adjustment is done to minimize the visibility of seams between images.

Additionally, in at least some instances, the panoramic constitute images overlap 460. In this instance, in response to detecting at least a portion of one of the plurality of panoramic constituent images (i.e., 430) overlapping an adjacent portion of one of the plurality of panoramic constituent images (i.e., 431) the overlapped areas (i.e., 460) of the images can be stacked, aligned and combined, as described above, such that the pixel values for corresponding locations of the overlapped images can be statistically combined.

In other embodiments, as mentioned, the set of images are not tagged as being part of a panoramic sequence. In this situation, as the user captures images (either manually through the press of a shutter release button, or automatically as the device operates in full-frame video mode), metadata is stored along with the images. The metadata can include information about the each image, such as time information (e.g., a time stamp indicating when the image was captured) and location information. Location information can include the location of the device and orientation of the device relative to a user as the images are captured. Upon providing the images to the remote server, the remote server can use the time and location information to determine images proximal in time and proximal in location, and based on this determination, the images can be "post tagged" or grouped as being part of a panoramic sequence. The images can then be analyzed for similarity, where when the similarity exceeds a threshold, the images can be combined as the panoramic sequence.

Having performed these operations, the remote server can further process the panoramic sequence, such as by performing a number of other processing algorithms 454 that can be used to correct for lens distortion, perspective, brightness, brightness and gamma blend, and rotation. The panoramic sequence can be communicated to the computing device. Alternatively, when the user accesses the remote server, such as to access a cloud-based photo album, the device created subsampled panorama can serve as a key to the full resolution panorama sequence, which can then be downloaded to the computing device.

In some embodiments, a subsampled version of the panoramic sequence may be communicated to the user's device (while a full resolution version of the panoramic sequence is stored at the remote server). This is useful in the situation where the user's device does not have the ability to display a high resolution image. This is also useful in the situation where the remote server determined that images captured by the user may have been intended to create a panoramic image (e.g., based at least upon timing and location information associated with the images), and receiving the subsampled version of the panoramic sequence can be used to alert the user that the server recognized that the user may be attempting to create a panoramic image, and thus, automatically created such an image. This advantageously allows a user to continuously capture pictures without having to worry about camera settings.

It should be noted that other imaging applications can be used within the scope of the embodiments described herein, as will be evident to one of ordinary skill in the art, where one or more images can be provided to a remote-server or other system from a portable computing device having greater processing power to be processed and then communicated back to the computing device.

Figure 5:
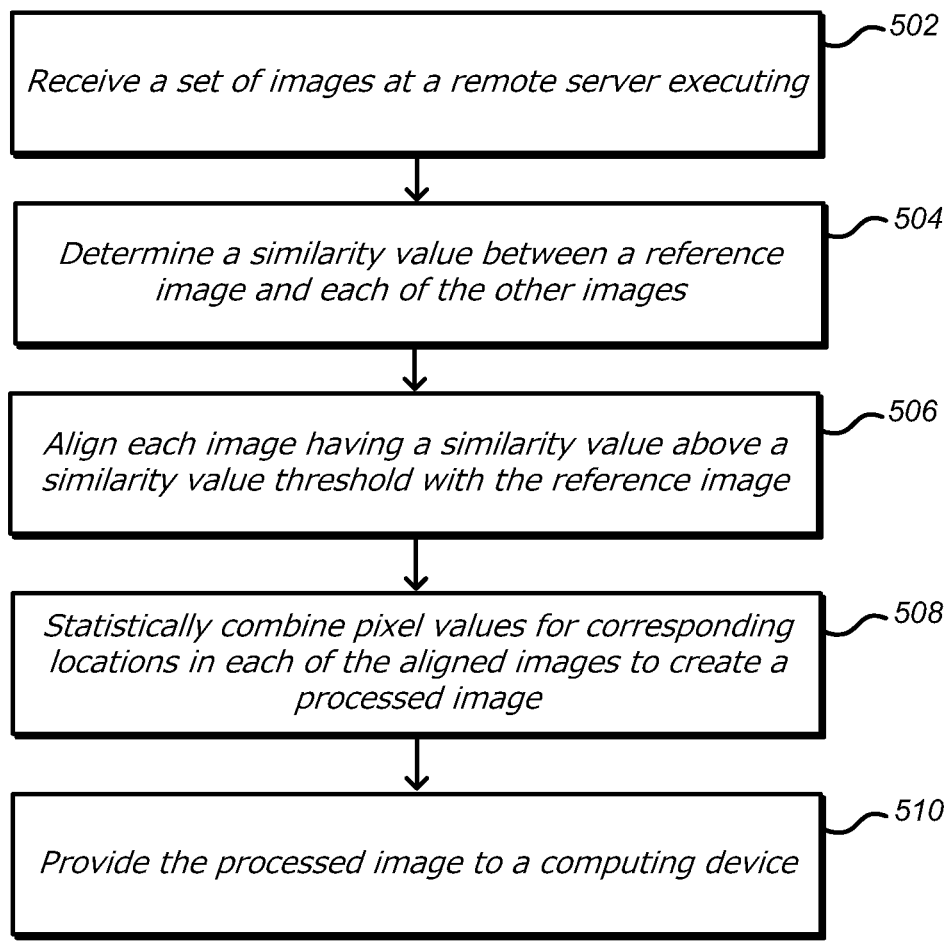
FIG. 5 illustrates an example process for producing an image at a remote server based on image or video data captured by a portable computing device, in accordance with various embodiments.

FIG. 5 illustrates an example process for selectively managing imaging elements, in accordance with various embodiments. It should be understood that, for any process described herein, that there can be additional or fewer steps performed in similar or alternative orders, or in parallel, within the scope of the various embodiments unless otherwise stated. At step 502, a set of images is received, such as at a remote server executing across at least one network. The set of images can be captured by a camera of a computing device in response to an input by a user, such as an indication of a shutter release or an indication of a selection of a user-selectable element. The set of images can include a reference image and at least one other image, such as a first image captured subsequent to the reference image and a second image captured prior to the reference image, where each of the images includes a view of substantially a same area. In various embodiments, the computing device can be operating in a full-frame video mode in which the set of images can be captured in succession, the reference image being selected upon receiving the input by the user, and the other images being captured at least before or after the capturing of the reference image.

At step 504, a similarity value can be determined between the reference image and each of the first and second images. In accordance with an embodiment, the similarity value can be determined using a correlation algorithm or other similar algorithm. At step 506, each image having a determined similarity value above a similarity value threshold is aligned with the reference image. For example, aligning the images can include first determining a target portion of the reference image, such as a face or other recognizable object in the reference image. A first area of one of the images (i.e., the first image) can then be determined, where the first area can be substantially the same size and in the same position as the size and position of the target area. A first correlation value can then calculated between the target portion and the first area. A second area of one of the images (i.e., the second image) being substantially the same size and in the same position as the target area is determined, and a second correlation value between the target portion and the second area can be calculated. An alignment offset between the reference image and the at least one other image can then be determined based at least in part on first and second correlation value, and the reference image and the other images can be aligned based at least in part on the offset.

At step 508, pixel values for corresponding locations in each of the images can be statistically combined to create a processed image, where statistically combining pixel values for corresponding locations of the aligned images can include performing at least one of averaging pixel values for corresponding locations, weighted averaging pixel values for corresponding locations, or interpolating pixel values for corresponding locations.

In accordance with an embodiment, further analysis can be performed on the set of images. For example, the set of images can be analyzed using at least one object recognition algorithm to attempt to determine a target object (such as car, dog or other object) represented in the image, where the target object can have a position. In response to determining the target object, a movement of the target object in the set of images can be determined based at least in part on the position of the target object in each of the images, and in response to determining the movement, one or more sections of the target object in each image can be aligned to corresponding sections in the reference image. Thereafter, the pixel values are statistically combined for corresponding locations of the one or more sections of the set of images.

At step 510, the processed image is provided to the computing device for display on a display element (e.g., a screen) of the computing device. In accordance with an embodiment, a prompt (such as a pop-up or overlay) can be provided to a user upon receiving the processed image, where the user can select between a plurality of options associated with the processed image and the reference image. In accordance with an embodiment, the options can be, e.g., to save or discard the processed and/or the reference image. The display element can also include at least one user-selectable element (such as a touch screen button) that enables one of the plurality of options. A selection can then be received at the at least one user-selectable element, the selection indicative, e.g., of an acceptance of the processed image.

Thereafter, the processed image can be stored based at least in part on the received indication. For example, the reference image and the processed image can be stored at a remote server executing "in the cloud", where the reference image and the processed image can be accessible to the computing device for at least a predetermined period of time.

Figure 6:
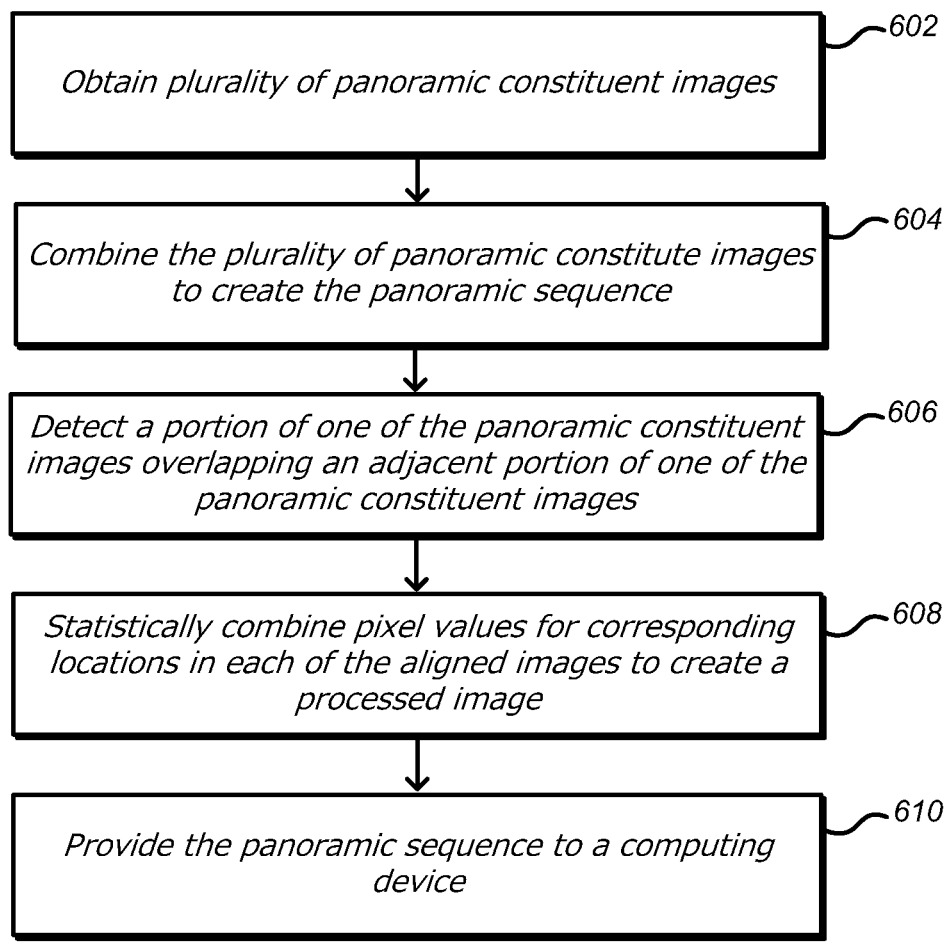
FIG. 6 illustrates an example process for producing a panoramic image at a remote server based on image or video data captured by a portable computing device, in accordance with various alternate embodiments.

FIG. 6 illustrates an example process for producing a panoramic image at a remote server based on image or video data captured by a portable computing device. In this situation, the device captures a series of images as a video stream as the device is panned (left to right, up and down, or both), or manually as the user continually presses a shutter release button while panning. In this way, a wide angle view can be synthesized form a series of images captured. At step 602, a set of images is obtained from the computing device. The set of images can include a plurality of panoramic constituent images, where each image of the plurality of panoramic constitute images can be tagged as being part of a panoramic sequence. In other embodiments, the set of images are not tagged as being part of a panoramic sequence. In this situation, as the user captures images (either manually through the press of a shutter release button, or automatically as the device operates in full-frame video mode), metadata is stored along with the images. The metadata can include information about the each image, such as time information (e.g., a time stamp indicating when the image was captured) and location information.

At step 604, the plurality of panoramic constituent images are combined to create the panoramic sequence based at least in part on the tag associated with each image. In the situation where the images are not tagged, the remote server can use the time and location information to determine images proximal in time and proximal in location, and based on this determination, the images can be "post tagged" or grouped as being part of a panoramic sequence. The images can then be analyzed for similarity, where when the similarity exceeds a threshold, the images can be combined as the panoramic sequence.

At step 606, in response to creating the panoramic sequence, at least a portion of one of the plurality of panoramic constituent images (or "post grouped" images) overlapping an adjacent portion one of the plurality of panoramic constituent images can be detected. At step 608, pixel values for corresponding locations of the portion of the one of the plurality of panoramic constituent images overlapping the adjacent portion of one of the plurality of panoramic constituent images can be statistically combined. Thereafter, at step 610, the panoramic sequence can be provided to the computing device. In accordance with various embodiments, the panoramic sequence can be keyed the device computed subsampled panoramic image. In this way, when a high resolution panoramic image is provided to the computing device, the device can replace and/or associate the high resolution panoramic image with the subsampled panoramic image. In other embodiments, a panoramic sequence adapted to a screen resolution of the user's computing device can be provided to the user, and a high resolution version of the panoramic sequence can be stored on the remote server such that the user can access the panoramic sequence from the computing device or from another device.

Figure 7:
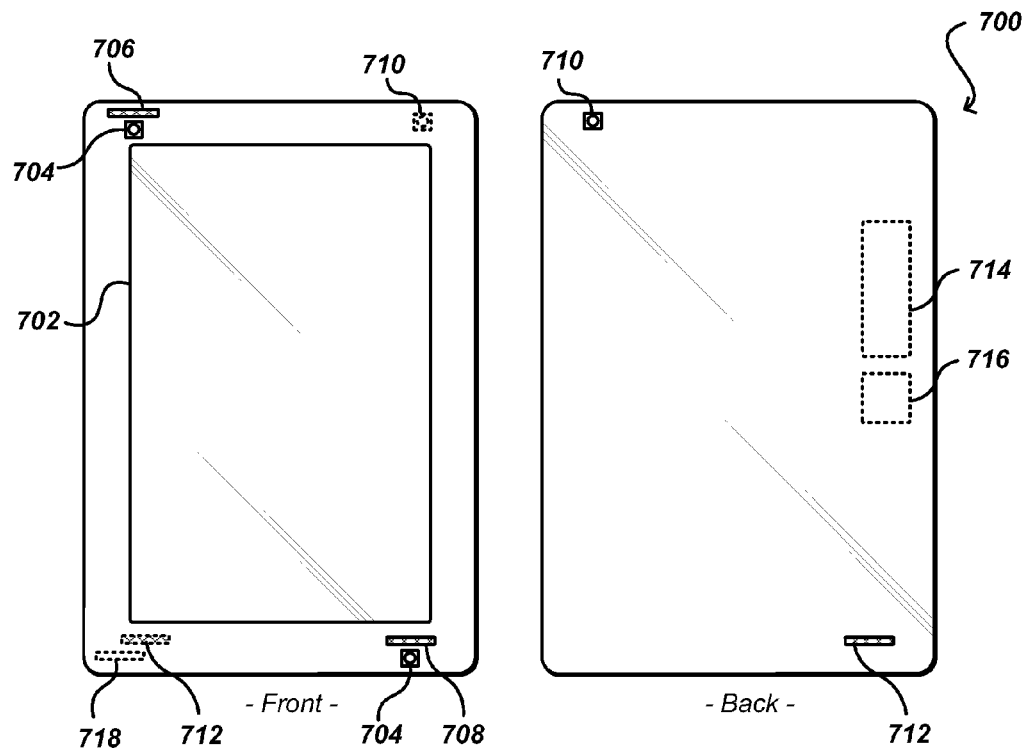
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a metal oxide semiconductor device (CMOS), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
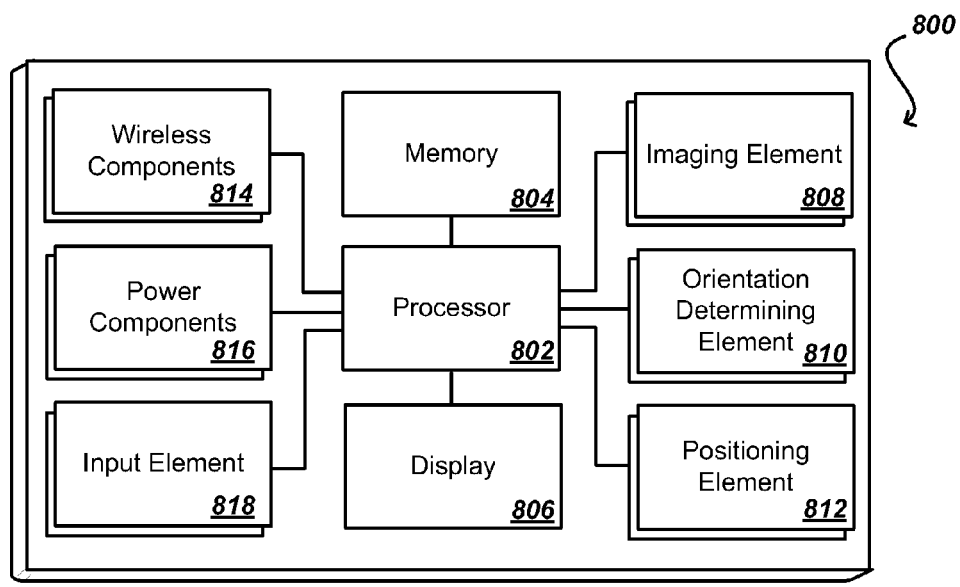
FIG. 8 illustrates an example set of basic components of a portable computing device, such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CMOS image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g., distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
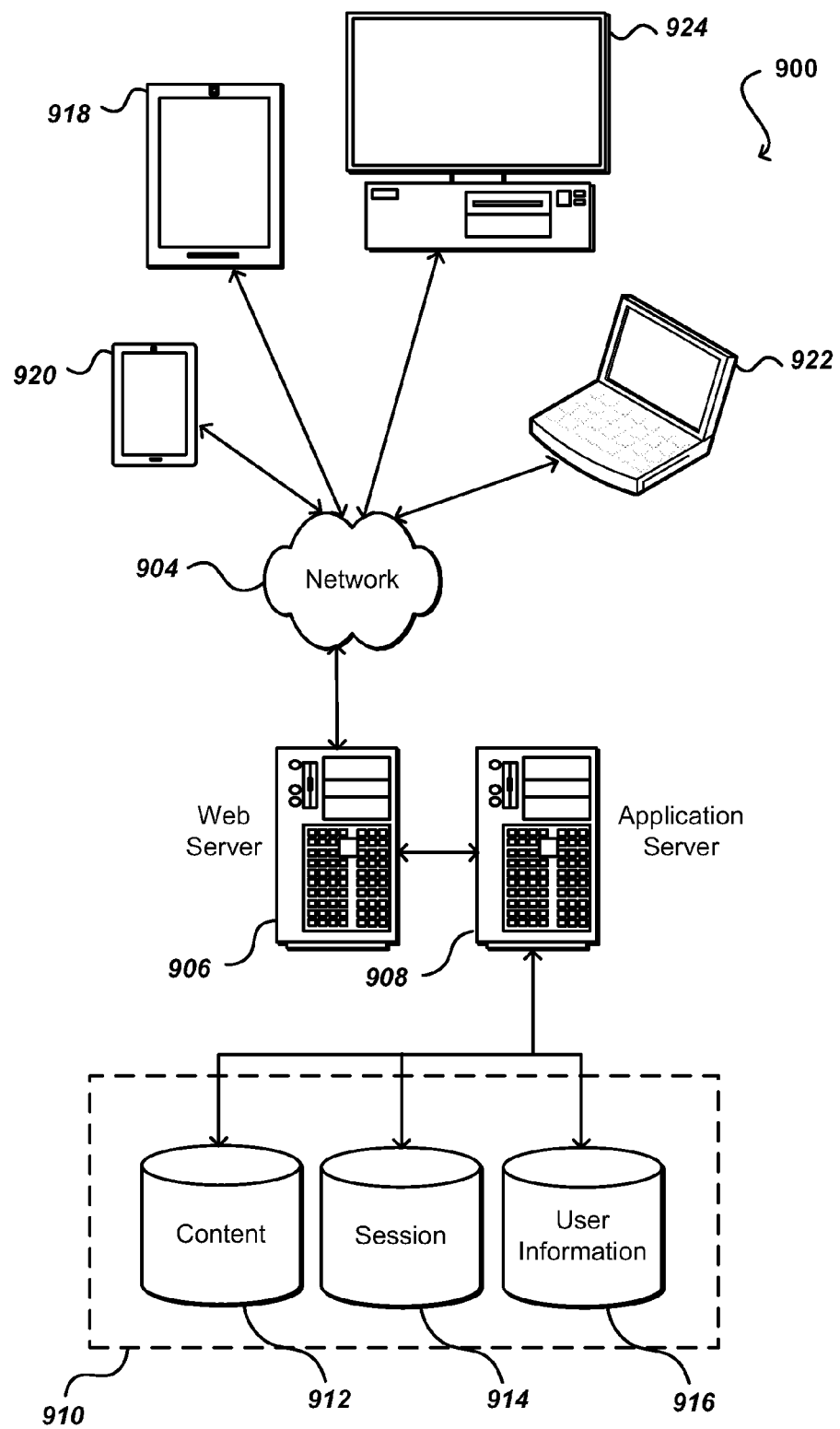
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from an image sensor of a computing device, video data representing a first image resolution;
receiving a selection of first image data of the video data;
determining a first position of a first representation of an object in the first image data;
determining a second position of a second representation of the object in second image data of the video data;
determining a movement of the object based at least in part on the first position and the second position;
separating the first representation into one or more first sections based at least in part on the movement;
separating the second representation into one or more second sections based at least in part on the movement;
determining an image stack including at least a portion of the first image data overlaying at least a portion of the second image data by aligning the one or more first sections and the one or more second sections;

generating composite image data representing a second image resolution greater than the first image resolution based at least in part on pixel values of the image stack; and sending the composite image data to the computing device.

2. The computer-implemented method according to claim 1, further comprising:

statistically combining the pixel values of the image stack.

3. The computer-implemented method according to claim 2, further comprising at least one of averaging the pixel values or interpolating the pixel values.

4. The computer-implemented method according to claim 1, further comprising:

generating the composite image data in response to receiving a single input on the computing device.

5. The computer-implemented method of claim 4, further comprising:

detecting the single input as an interaction with an image capture icon.

6. The computer-implemented method according to claim 1, further comprising:

receiving the selection of the first image data in response to an input associated with recording the video data.

7. The computer-implemented method of claim 1, wherein the composite image data represents a panoramic view.

8. The computer-implemented method of claim 1, further comprising:

combining first individual color vectors of the first image data and second individual color vectors of the second image data.

9. The computer-implemented method of claim 1, further comprising:

causing the composite image data to be displayed on a display element of the computing device;
providing a prompt including a plurality of options associated with the composite image data; and
receiving a selection of one of the plurality of options.

10. The computer-implemented method of claim 9, further comprising:

performing at least one of saving the composite image data or discarding one or more remaining portions of the video data in response to receiving the selection of one of the plurality of options.

11. The computer-implemented method of claim 9, further comprising:

discarding the composite image data in response to receiving the selection of one of the plurality of options.

12. The computer-implemented method of claim 1, further comprising:

obtaining first metadata from the first image data
obtaining second metadata from the second image data;
sending the first metadata and the second metadata to a remote server; and
determining, by the remote server, if the first metadata and the second metadata are proximal in time and location.

13. A computing system, comprising:

at least one processor; and
memory including instructions that, when executed by the at least one processor, cause the computing system to:

receive, from an image sensor of a computing device, video data representing a first image resolution;
receive a selection of first image data of the video data;
determine a first position of a first representation of an object in the first image data;
determine a second position of a second representation of the object in second image data of the video data;
determine a movement of the object based at least in part on the first position and the second position;
separate the first representation into one or more first sections based at least in part on the movement;
separate the second representation into one or more second sections based at least in part on the movement;
determine an image stack including at least a portion of the first image data overlaying at least a portion of the second image data by aligning the one or more first sections and the one or more second sections;
generate composite image data representing a second image resolution greater than the first image resolution based at least in part on pixel values of the image stack; and
send the composite image data to the computing device.

14. The computing system according to claim 13, wherein the instructions, when executed, further cause the computing system to:

statistically combine the pixel values of the image stack.

15. The computing system according to claim 14, wherein the instructions, when executed, further cause the computing system to:

average the pixel values or interpolate the pixel values.

16. The computing system according to claim 13, wherein the instructions, when executed, further cause the computing system to:

generate the composite image data in response to receiving a single input on the computing device.

17. The computing system according to claim 13, wherein the instructions, when executed, further cause the computing system to:

receive the selection of the first image data in response to an input associated with recording the video data.

18. The computing system according to claim 13, wherein the composite image data represents a panoramic view.

19. The computing system according to claim 13, wherein the instructions, when executed, further cause the computing system to:

combine first individual color vectors of the first image data and second individual color vectors of the second image data.

20. The computing system according to claim 13, wherein the instructions, when executed, further cause the computing system to:

cause the composite image data to be displayed on a display element of the computing device;
provide a prompt including a plurality of options associated with the composite image data;
receive a selection of one of the plurality of options; and
perform at least one of saving the composite image data or discarding one or more remaining portions of the video data in response to receiving the selection of one of the plurality of options.

* * * * *